US009248610B2

(12) United States Patent
Fromm

(10) Patent No.: US 9,248,610 B2
(45) Date of Patent: Feb. 2, 2016

(54) METHODS OF MAKING BELTS FOR APPARATUS USEFUL IN PRINTING

(75) Inventor: Paul M. Fromm, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 1693 days.

(21) Appl. No.: 12/493,780

(22) Filed: Jun. 29, 2009

(65) Prior Publication Data
US 2010/0327481 A1 Dec. 30, 2010

(51) Int. Cl.
| | |
|---|---|
| B29C 67/00 | (2006.01) |
| B29C 39/02 | (2006.01) |
| B29C 39/12 | (2006.01) |
| B29C 41/04 | (2006.01) |
| B29C 41/22 | (2006.01) |
| B29C 33/38 | (2006.01) |
| B29C 33/42 | (2006.01) |
| B29K 27/12 | (2006.01) |
| B29K 79/00 | (2006.01) |
| B29K 83/00 | (2006.01) |
| B29K 105/16 | (2006.01) |
| B29K 105/18 | (2006.01) |
| B29L 9/00 | (2006.01) |
| B29L 31/00 | (2006.01) |
| G03G 15/20 | (2006.01) |

(52) U.S. Cl.
CPC .......... *B29C 67/0018* (2013.01); *B29C 39/026* (2013.01); *B29C 39/123* (2013.01); *B29C 41/045* (2013.01); *B29C 41/22* (2013.01); *B29C 33/3828* (2013.01); *B29C 33/424* (2013.01); *B29K 2027/12* (2013.01); *B29K 2079/08* (2013.01); *B29K 2083/00* (2013.01); *B29K 2105/16* (2013.01); *B29K 2105/18* (2013.01); *B29L 2009/00* (2013.01); *B29L 2031/709* (2013.01); *B29L 2031/767* (2013.01); *G03G 15/2064* (2013.01); *G03G 2215/2016* (2013.01); *G03G 2215/2032* (2013.01); *G03G 2215/2048* (2013.01)

(58) Field of Classification Search
None
See application file for complete search history.

(56) References Cited

U.S. PATENT DOCUMENTS

| | | | | |
|---|---|---|---|---|
| 4,711,833 A | * | 12/1987 | McAneney et al. | 430/131 |
| 4,747,992 A | * | 5/1988 | Sypula et al. | 264/130 |
| 5,411,779 A | * | 5/1995 | Nakajima et al. | 428/36.91 |
| 6,001,440 A | * | 12/1999 | Miyamoto et al. | 428/36.9 |
| 6,139,784 A | * | 10/2000 | Oshima et al. | 264/104 |
| 6,278,858 B1 | * | 8/2001 | Nakazawa et al. | 399/302 |
| 6,393,226 B1 | * | 5/2002 | Charlebois et al. | 399/12 |
| 6,500,367 B2 | * | 12/2002 | Naus et al. | 264/39 |
| 6,641,760 B2 | * | 11/2003 | Matsuo et al. | 264/105 |
| 6,927,006 B2 | * | 8/2005 | Finn et al. | 430/124.35 |

(Continued)

OTHER PUBLICATIONS

Sandra L. Schmitt; "Mass-Less Belt Mandrel"; U.S. Appl. No. 12/276,513; Filed Nov. 24, 2008.

*Primary Examiner* — Benjamin Schiffman
(74) *Attorney, Agent, or Firm* — Ronald E. Prass, Jr.; Prass LLP

(57) ABSTRACT

The disclosed embodiments include methods of making belts for apparatuses useful in printing and fuser belts for apparatus useful for printing. An embodiment of the methods includes forming a first layer of the belt using a first material comprising a first polymer applied on an inner surface of a mandrel, the first layer including a first outer surface facing the inner surface of the mandrel and a first inner surface; forming a second layer of the belt using a second material comprising a second polymer applied over the first inner surface, the second layer including a second inner surface; and removing the belt from the mandrel.

18 Claims, 6 Drawing Sheets

(56) References Cited

U.S. PATENT DOCUMENTS

| | | |
|---|---|---|
| 7,491,281 B2 | 2/2009 | Darcy, III et al. |
| 7,662,329 B2 * | 2/2010 | Tomiyama et al. ............ 264/310 |
| 2004/0051211 A1 * | 3/2004 | Mastro et al. ................. 264/438 |
| 2007/0107829 A1 | 5/2007 | Darcy, III et al. |
| 2007/0190320 A1 * | 8/2007 | Longhenry et al. ........... 428/375 |
| 2007/0277690 A1 * | 12/2007 | Gervasi et al. ................ 101/368 |
| 2008/0037069 A1 | 2/2008 | Mestha et al. |
| 2010/0226701 A1 * | 9/2010 | Moorlag ....................... 399/333 |

* cited by examiner

METHODS OF MAKING BELTS FOR APPARATUS USEFUL IN PRINTING

BACKGROUND

Some printing apparatuses include a nip formed by a belt and roll. In such apparatuses, media are fed to the nip and contacted by the belt and roll to treat marking material on media to form images on the media.

It would be desirable to provide methods for making belts for apparatuses useful in printing that provide additional manufacturing options, as well as belts made by the methods.

SUMMARY

Belts and methods of making belts for apparatuses useful in printing are provided. An exemplary embodiment of a method of making a belt for an apparatus useful in printing comprises forming a first layer of the belt using a first material comprising a first polymer applied on an inner surface of a mandrel, the first layer including a first outer surface facing the inner surface of the mandrel and a first inner surface; forming a second layer of the belt using a second material comprising a second polymer applied over the first inner surface, the second layer including a second inner surface; and removing the belt from the mandrel.

DRAWINGS

DETAILED DESCRIPTION

The disclosed embodiments include a method of making a belt for an apparatus useful in printing. The method comprises forming a first layer of the belt using a first material comprising a first polymer applied on an inner surface of a mandrel, the first layer including a first outer surface facing the inner surface of the mandrel and a first inner surface; forming a second layer of the belt using a second material comprising a second polymer applied over the first inner surface, the second layer including a second inner surface; and removing the belt from the mandrel.

The disclosed embodiments further include a method of making a fuser belt for an apparatus useful in printing. The method comprises forming a first layer of the belt using a first material comprising a first polymer applied on an inner surface of a mandrel, the first layer including a first outer surface facing the inner surface of the mandrel and a first inner surface; forming a second layer of the belt using a second material comprising a second polymer applied over the first inner surface, the second layer including a second inner surface; forming a third layer of the belt from a third material comprising a third polymer applied over the second inner surface, the third layer including a third inner surface; and removing the belt from the mandrel.

The disclosed embodiments further include a fuser belt for an apparatus useful for printing. The fuser belt comprises a first layer comprised of a first polymer, the first layer including a first outer surface and a first inner surface; and a second layer comprised of a second polymer overlying the first inner surface, the second layer including a second inner surface. The first layer of the belt is formed by applying the first material on an inner surface of a mandrel having a surface finish. The first outer surface has an as-molded surface finish based on the surface finish of the mandrel.

As used herein the term "printing apparatus" encompasses any apparatus, such as a digital copier, bookmaking machine, multifunction machine, and the like, or portions of such apparatuses, that can perform a print outputting function for any purpose. The printing apparatuses can use various types of solid and liquid marking materials, and various process conditions to treat the marking material and form images on media.

Figure 1:
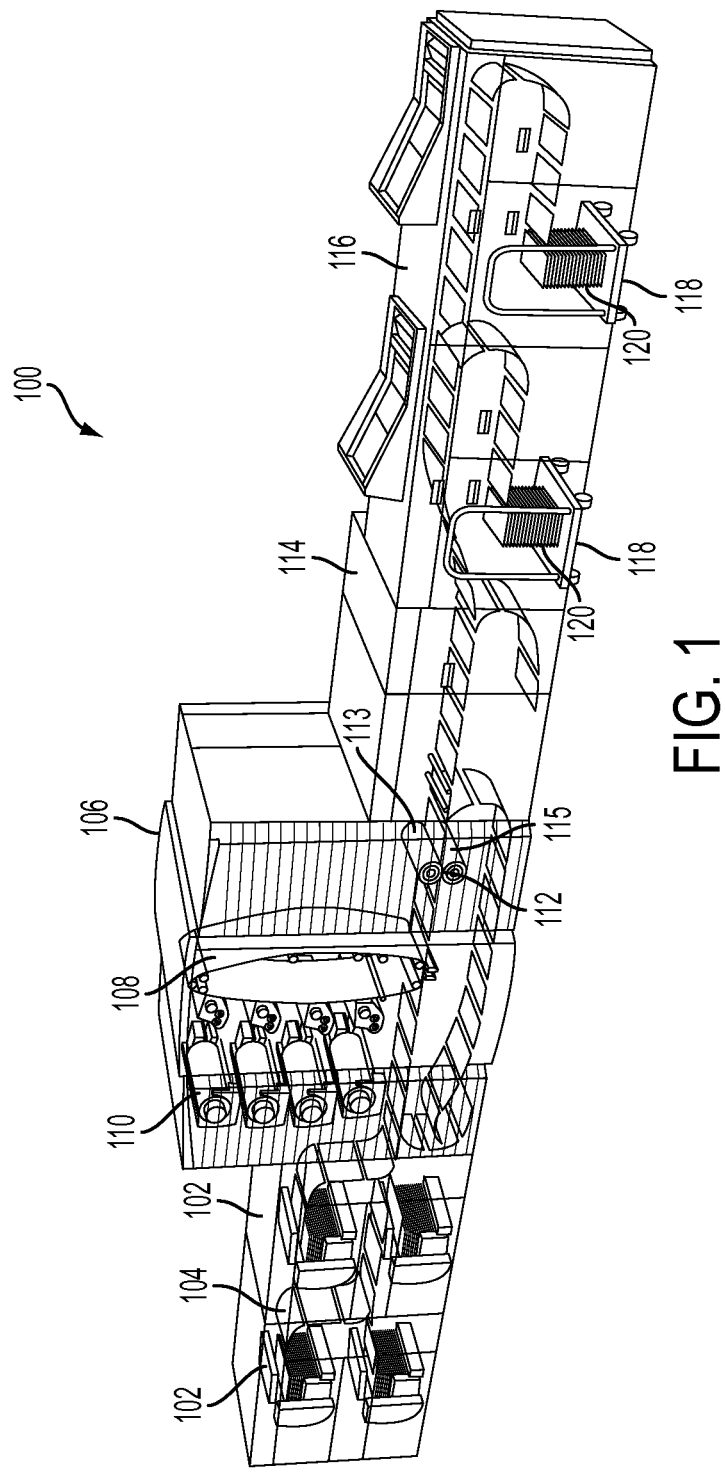
FIG. 1 depicts an exemplary embodiment of a printing apparatus.

FIG. 1 illustrates an exemplary printing apparatus 100, as disclosed in U.S. Patent Application Publication No. 2008/0037069, which is incorporated herein by reference in its entirety. The printing apparatus 100 can be used to produce prints using media with various sizes and weights.

In embodiments, the printing apparatus 100 includes two media feeder modules 102 arranged in series, a printer module 106 adjacent the downstream media feeding module 102, an inverter module 114 adjacent the printer module 106, and two stacker modules 116 adjacent the inverter module 114.

In the printing apparatus 100, the media feeder modules 102 feed media to the printer module 106. In the printer module 106, a marking material (toner) is transferred from a series of developer stations 110 to a charged photoreceptor belt 108 to form toner images on the photoreceptor belt and produce color prints. The toner images are transferred to one side of respective media 104 fed through the paper path. The media are advanced through a fuser 112 including rolls 113, 115, which apply heat and pressure to fuse the toner images on the media. The inverter module 114 manipulates media exiting the printer module 106 by either passing the media through to the stacker modules 116, or by inverting and returning the media to the printer module 106. In the stacker modules 116, the printed media are loaded onto stacker carts 118 in stacks 120.

Methods for making belts for apparatuses useful in printing and belts useful in such apparatuses are provided. In embodiments, the belts are continuous. Embodiments of the apparatuses include a belt supported on rolls. The belt and a second member facing the belt, such as an external pressure roll, form a nip. Media are fed to the nip and contacted by the belt and second member. Embodiments of the apparatuses are constructed to treat marking material carried on the media. The marking material can be toner or ink in embodiments of the apparatuses. In embodiments, at least one of the belt and second member is heated in order to apply heat and pressure to the media at the nip to treat the marking material.

Figure 2:
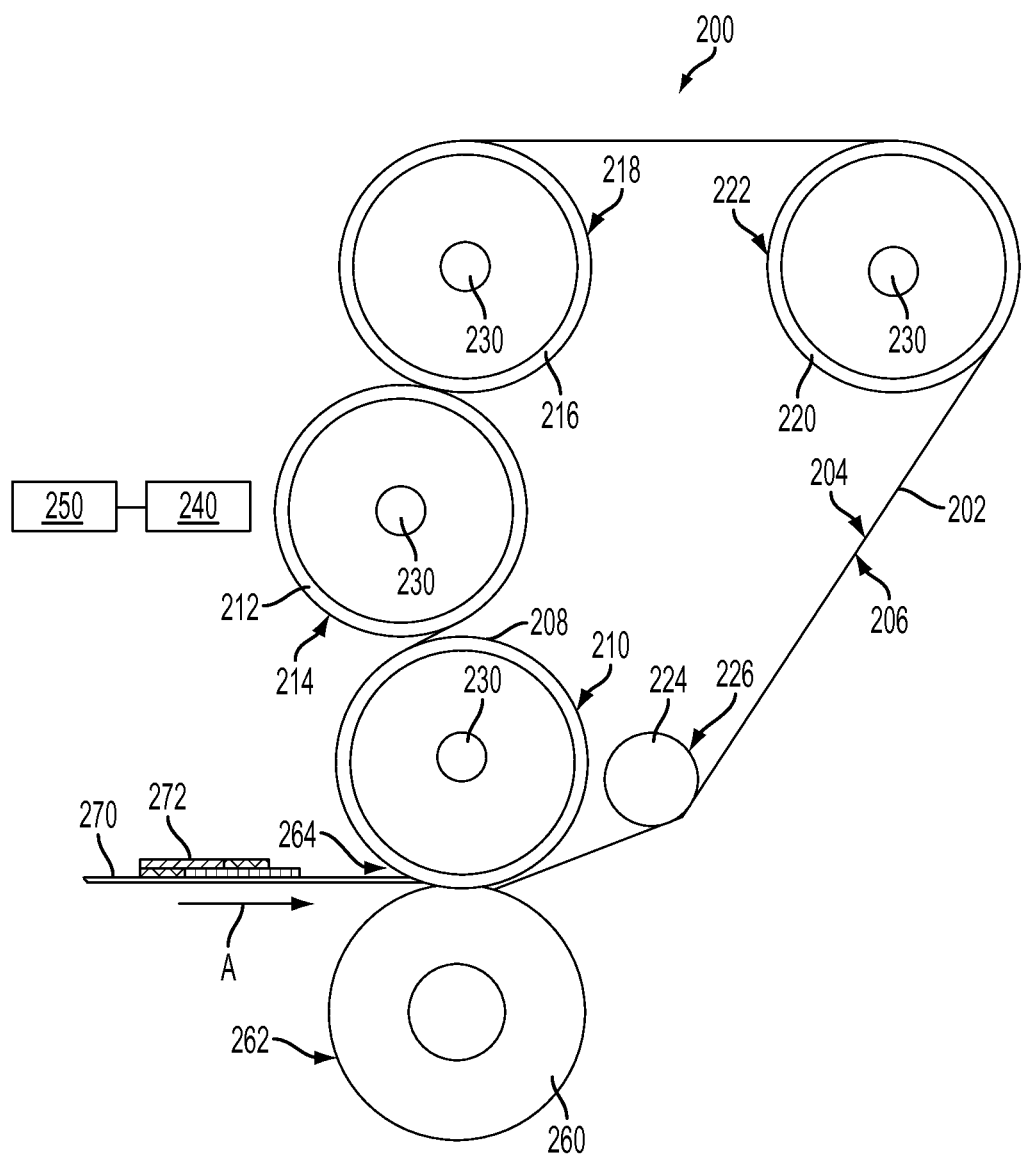
FIG. 2 depicts an exemplary embodiment of a fuser.

FIG. 2 illustrates an exemplary embodiment of an apparatus useful in printing. The illustrated apparatus is a fuser 200. Embodiments of the fuser 200 can be used in different types of printing apparatuses. For example, the fuser 200 can be used to replace the fuser 112 in the printing apparatus 100 shown in FIG. 1.

As shown in FIG. 2, the fuser 200 includes a continuous belt 202 having an inner surface 204 and an outer surface 206. The belt 202 is rotatable about a fuser roll 208, external roll 212, internal rolls 216, 220 and an idler roll 224. In other embodiments, in addition to the fuser roll 208, the fuser 200 can have different numbers, types and arrangements of rolls supporting the belt 202. In the fuser 200, the fuser roll 208, internal rolls 216, 220 and idler roll 224 include respective outer surfaces 210, 218, 222, 226 contacting the inner surface 204 of the belt 202, and the external roll 212 includes an outer surface 214 contacting the outer surface 206 of the belt 202.

The fuser roll 208, external roll 212 and internal rolls 216, 220 each include an internal heat source 230 to heat the belt 202. In embodiments, the heat sources 230 can be, e.g., one or more axially-extending heating lamps connected to a power supply 240. The power supply 240 is connected to the controller 250 to control the supply of power to the heat sources 230. The heat sources 230 are actuated to heat the belt 202 to a temperature effective to treat marking material on media.

The fuser 200 further includes an external pressure roll 260 with an outer surface 262. The outer surface 262 and the outer surface 206 of the belt 202 form a nip 264. In embodiments, the pressure roll 260 includes a core and one or more layers overlying the core. The outer layer includes the outer surface 262. In embodiments, the core can be comprised of aluminum, or the like, and the overlying layer(s) of an elastically deformable material, such as silicone rubber, perfluoroalkoxy (PFA) copolymer resin, or the like.

FIG. 2 depicts a medium 270 with marking material 272 being fed to the nip 264 in the process direction A. In embodiments, the fuser roll 208 can be rotated counter-clockwise, and the external pressure roll 260 clockwise, to convey the medium 270 through the nip 264 in process direction A. The media can be paper sheets, transparencies, packaging materials, and the like. The media can be coated or uncoated.

Methods of making belts for apparatuses useful in printing and belts made by the methods are provided. In embodiments, the belts are continuous. The belts can be used, e.g., in the fuser 200, as well as in other apparatus useful for printing. The belts are flexible and include two or more layers that provide selected physical, chemical and/or electrical properties in the belts. For example, embodiments of the belts can include an inner layer having the inner surface and an outer layer overlying the inner layer and having the outer surface. Other embodiments of the belts can include, e.g., an inner layer, an intermediate layer overlying the inner layer, and an outer layer overlying the intermediate layer. In such embodiments, the inner layer includes the inner surface of the belt, and the outer layer includes the outer surface of the belt.

Figure 3:
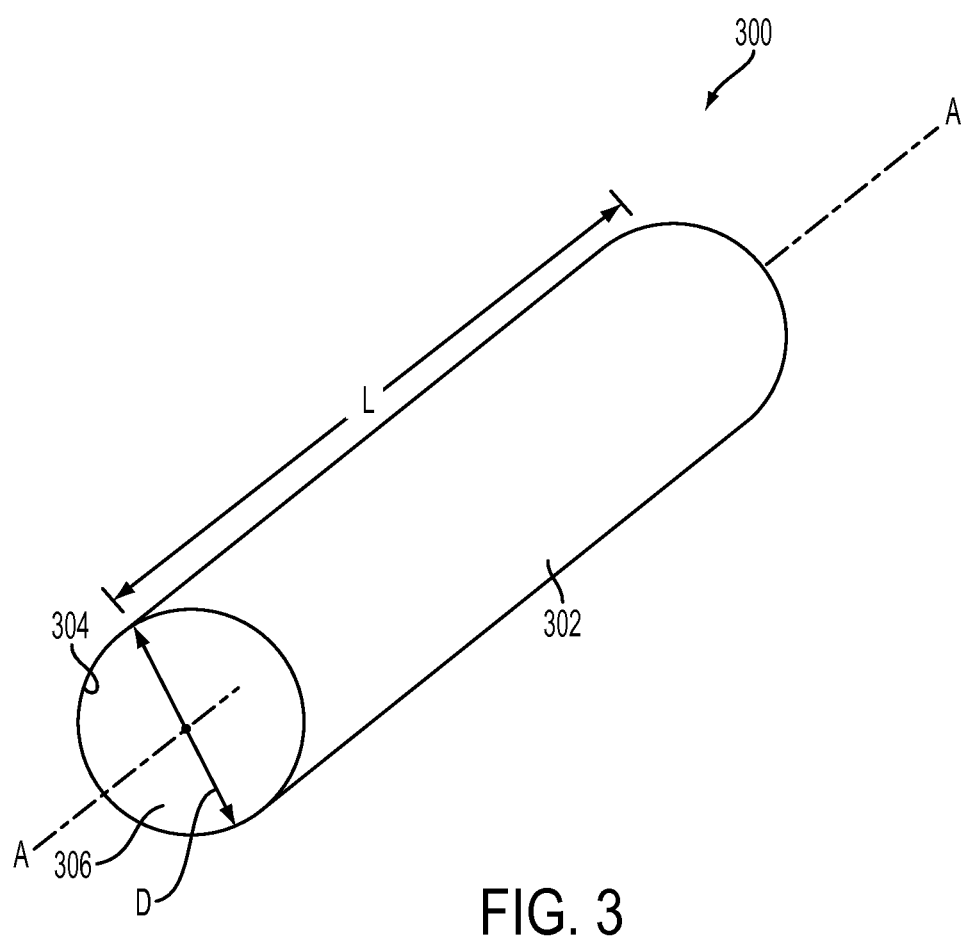
FIG. 3 depicts an exemplary embodiment of a mandrel.

In embodiments, the belt is formed against the inner surface of a rigid mandrel including an internal cavity. FIG. 3 depicts an exemplary mandrel 300 having a cylindrical, tubular configuration. The mandrel 300 includes an outer surface 302 and an inner surface 304 defining an internal cavity 306. In embodiments, the mandrel 300 is closed at one end to support the mandrel tube to a supporting shaft. A longitudinal axis A-A extends along the length, L, of the mandrel 300. Typically, the mandrel can have an inner diameter, D, of about 50 mm to about 320 mm, and an inner circumference of about 150 mm to about 1000 mm.

The mandrel can be comprised of any suitable metal, such as steel, stainless steel, aluminum, aluminum alloys, or the like. Other non-metallic materials that can withstand the temperatures reached during sintering or curing of the layers of the belts can be used, such as polymers, composites or ceramics.

The outer surface of the belts formed using the mandrels have an as-formed finish that is dependent on the finish of the inner surfaces of the mandrels. For example, the inner surface 304 of the mandrel 300 can be smooth to produce a smooth surface finish for the outer surface of the belt. In other embodiments, the inner surface 304 of the mandrel 300 can be roughened or textured by a mechanical technique (e.g., sanding or blasting) and/or a chemical technique (e.g., chemical etching) to produce a corresponding roughened or textured finish for the outer surface of the belt. Depending on the surface finish of the inner surface 304 of the mandrel 300, the outer surface of the belt can have, e.g., a micro-texture or a finer nano-texture. In embodiments, the micro-textured surface of the mandrel 300 can includes features having a maximum dimension of less than about $10^{-5}$ meters (10 microns). A nano-textured surface of the mandrel 300 can include features having a maximum dimension of less than about $10^{-8}$ meters (10 nano-meters). A belt micro-texture can enhance stripping of media from the outer surface of the belt, and a belt nano-texture can affect the wetting of marking materials and release agents. The surface finish formed on the belt based on the finish of the inner surface of the mandrel can be produced without performing any secondary operations on the belt.

In embodiments, the respective layers of the belt are formed using selected materials that provide the desired combination of physical, chemical and/or electrical properties at different regions across the belt thickness. In embodiments, the outer layer of the belt is formed first on the inner surface of the mandrel. Then, one or more additional layers are formed over the inner surface of the outer layer. The innermost layer forms the inner surface of the belt.

Figure 4A:
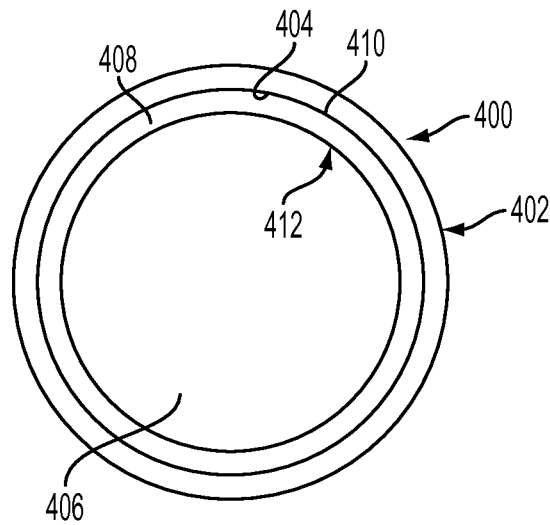
FIGS. 4A to 4C depict the formation of an exemplary three-layered belt on the inner surface of a mandrel.
Figure 4B:
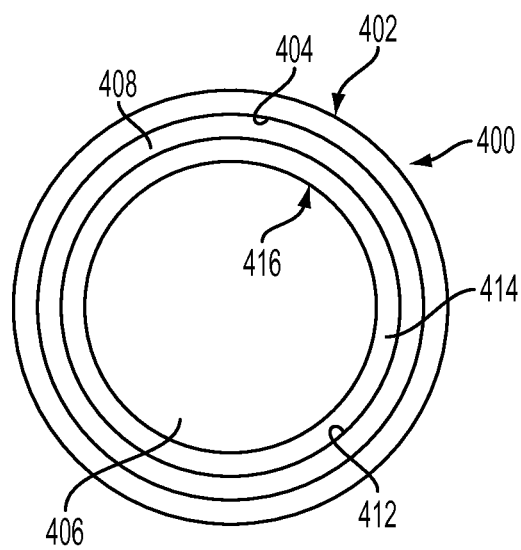
Figure 4C:
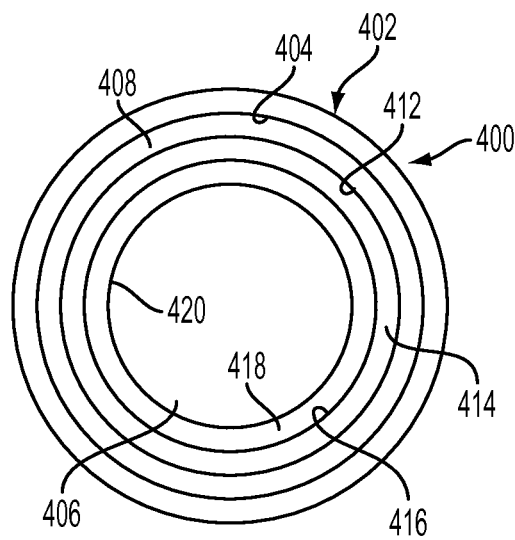

FIG. 4A to 4C depict the forming of an exemplary three-layered belt on the inner surface 404 of a mandrel 400 including an internal cavity 406 and an outer surface 402. FIG. 4A shows an outer layer 408 formed on the inner surface 404 of the mandrel 400. The outer layer 408 includes an outer surface 410 and an inner surface 412. The outer surface 410 forms the outer surface of the as-formed belt.

The outer layer 408 can typically have a thickness of about 10 μm to about 50 μm. In embodiments, the outer layer 408 comprises a polymer having sufficiently-high flexibility in the belt. The polymer can be, e.g., a fluoropolymer. In embodiments, the material of the outer layer 408 desirably provides the properties of low surface energy, high abrasion resistance, low modulus of elasticity (low stiffness), and a coefficient of friction sufficiently low to reduce adherence of marking materials, such as toner, to the outer surface of the belt. A suitable material for the outer layer 408 is TEFLON® PTFE (polytetrafluoroethylene) available from E. I. du Pont de Nemours and Company. This material has a maximum operating temperature of about 260° C. TEFLON® PTFE can be applied to mandrels made of metals, such as carbon steel, aluminum, stainless steel and steel alloys, and to non-metallic materials, such as glass, fiberglass, rubber and plastics that are capable of withstanding the curing temperature.

In embodiments, the material used to form the outer layer 408 of the belt has the highest curing or sintering temperature of the materials used to make the structural layers of the belt. Thermoplastic coatings are sintered and thermoset materials are cured. A layer of plastic particles is applied to a surface using a dry powder application or wet coating with the particles suspended in a liquid that is evaporated away. The particles are then heated until they melt and flow together to form a continuous film. The molecules of the material cross-link to each other when heat is applied and/or a catalyst is present. Using a high temperature to sinter a thermoplastic outer layer can result in this layer having a low porosity (high density) that approaches 0% porosity (full density) similar to an extruded material. Also, by using a material having the highest curing or sintering temperature to form the outer layer, the curing or sintering temperature range for the outer layer can be increased to an optimal value without risk of damaging other layers of material forming the belt, which increases the number of materials that are suitable for making the outer layer.

The inner surface 404 of the mandrel 400 can be coated with a mold release agent, such as a wax, fluorocarbon, or the like, to enhance removal of the belt from the mandrel after the molding process is completed.

In other embodiments, the outer layer 408 of the belt can comprise a material that has a higher surface energy than TEFLON® PTFE, or the like, but which provides one or more desirable properties, such as high abrasion resistance. An exemplary group of polymers that provides these properties is the fluoroelastomers, such as VITON® fluoroelastomer available from E.I. DuPont de Nemours and Company Performance Elastomers. This material has a heat resistance of about 250° C. To reduce adherence of marking materials to the outer surface of the outer layer, a sufficient amount of a release agent, such as silicone oil, or the like, can be applied to the outer surface 410 of the outer layer 408.

The outer layer 408 typically has a thickness in the finished belt of about 10 μm to about 50 μm to allow the outer layer 408 to strain around image topography on media and media topography.

In embodiments, the outer layer 408 can comprise two or more layers. For example, the outer layer can comprise a first outer layer formed on the inner surface 404 of the mandrel 400, and a second outer layer formed on the inner surface of the first outer layer and forming the inner surface 412 of the outer layer 408. The two outer layers can have different compositions and properties from each other. For example, the first outer layer can have a lower surface energy and a lower thermal conductivity than the second outer layer. The two outer layers can have the same or different thicknesses. In embodiments, the first and second layers can comprise the same base material and contain different amounts of additives to give the layers different properties. When the layers are applied dry and substantially do not mix, they can be sintered or cured in one step. When the first and second layers are applied wet, they are likely are mix. The first layer can be dried and/or partially cured or sintered before the second layer is applied. As the base material is the same in the first and second layers, adhesives do not need to be used between the layers.

FIG. 4B shows an intermediate layer 414 formed on the inner surface 412 of the outer layer 408. The intermediate layer 414 underlies the outer layer 408 in the as-formed belt. The intermediate layer 414 has an inner surface 416. In embodiments, the intermediate layer 414 can comprise a polymer that has a sufficiently-high coefficient of thermal conductivity to enable sufficient heat transfer within the belt, a high specific heat to store energy sufficiently, and a sufficiently-low modulus of elasticity (i.e., low stiffness) in the radial direction (i.e., thickness dimension of the intermediate layer) to deform sufficiently to be able to conform to image topography on media and to media surface topography (roughness). An exemplary material that can be used to form the intermediate layer 414 is silicone rubber.

In embodiments, the polymer used to form the intermediate layer 414 of the belt can have a lower curing or sintering temperature than the polymer of the outer layer 408. This feature is desirable in embodiments in which the outer layer 408 is made of a thermoplastic material, in order to avoid adversely affecting the structure and/or properties of the outer layer 408 during heating of the material of the intermediate layer 414 after being applied inside the mandrel.

The intermediate layer 414 can typically have a thickness of about 50 m to about 1000 μm.

FIG. 4C shows an inner layer 418 (base layer) formed on the inner surface 416 of the intermediate layer 414. The inner layer 418 underlies the intermediate layer 414 in the as-formed belt. The inner layer 418 has an inner surface 420 forming the inner surface of the belt. In embodiments, the inner layer 418 can comprise a polymer that has a sufficiently-high modulus of elasticity to provide a sufficiently-high circumferential stiffness to allow the belt to be tensioned and undergo a small circumferential elongation of less than about 5%, less than about 3%, or less than about 1%, when installed on the supporting rolls of the fuser. Exemplary materials that can provide these properties in the inner layer 418 are the polyimides. An exemplary polyimide that can be used to form the inner layer 418 is Kapton® polyimide available from E.I. du Pont de Nemours and Company. Polyimides are a thermoset material typically formed from a monomer dissolved in a liquid. The solvent is evaporated and heat is applied to the material to initiate cross-linking. In embodiments, this heating to achieve polyimide curing preferably uses minimal temperature and time conditions to minimize degradation of layers comprised of rubber previously applied to the mandrel. In embodiments, polyimides can be compression molded from partially cross-linked powder particles that are compressed in a mold and then heated to complete cross-linking. The intermediate layer can typically have a thickness of about 10 μm to about 50 μm.

In embodiments, the material used to form the inner layer 418 of the belt can have a lower curing or sintering temperature than the materials of the outer layer 408 and intermediate layer 414 to avoid adversely affecting the structure and/or properties of the outer layer 408 or intermediate layer 414 during curing or sintering of the material of the inner layer 418.

Figure 5:
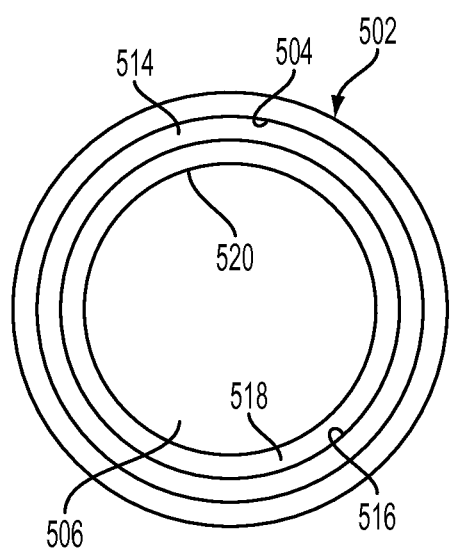
FIG. 5 depicts an exemplary two-layered belt formed on the inner surface of a mandrel.

FIG. 5 depicts an embodiment of a two-layered belt structure formed on an inner surface 504 of a mandrel 500. The belt structure includes an outer layer 514 having an inner surface 516, and an inner layer 518 formed on the inner surface 516. The inner layer 518 includes an inner surface 520, which forms the inner surface of the as-formed belt. In embodiments, the outer layer 514 can be comprised of the materials used to form the intermediate layer 414 shown in FIGS. 4A to 4C. The belt structure shown in FIG. 5 does not include a layer overlying the outer surface of the outer layer 414 having the composition of the outer layer 408 shown in FIGS. 4A to 4C. The belt structure shown in FIG. 5 can be used in fusers in which the outer layer of the belt provides suitable properties without the belt also having a layer with the properties of the outer layer 408.

In embodiments, at least one layer of the multi-layered belts can contain a filler material that provides desired physical, chemical and/or electrical properties in the belts. For example, the filler can be carbon, titanium dioxide, and like. In embodiments, the filler material is in particle form. For example, the particles can be fibers having a high aspect ratio, such as cylindrical- or rod-shapes, and the like. Exemplary rod-shaped particles can have a length of about 1.0 μm to about 50 μm and a diameter of about 0.1 μm to about 5 μm. In embodiments, the particles can have a loading, by volume, of about 2% to about 20%, in respective layers containing the particles. Inside the mandrel, the rod-shaped particles can be oriented in the radial direction in respective layers. That is, the length dimensions of the filler particles can be oriented substantially perpendicular to the outer surface of the layer(s) containing them. For example, carbon rods or other materials with high thermal conductivity can be oriented in the radial direction in at least one layer to increase thermal conductivity in the thickness direction of the belt.

Figure 6:
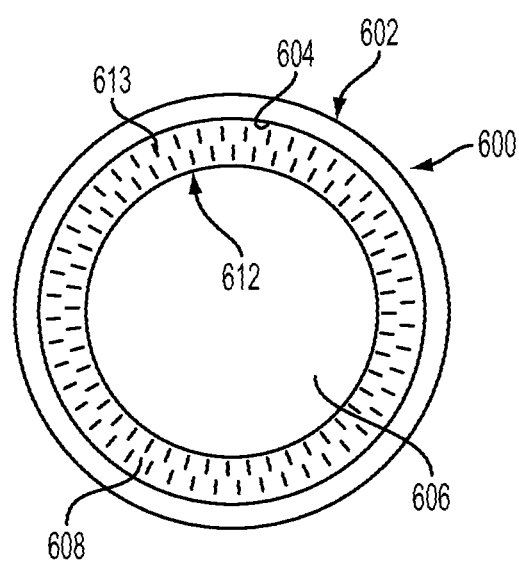
FIG. 6 depicts an exemplary two-layered belt including a layer containing filler particles formed on the inner surface of a mandrel.

FIG. 6 depicts a layer 608 of a belt structure formed on the inner surface 604 of a mandrel 600. As shown, the layer 608 contains filler particles 613. The filler particles 613 are rod-shaped and oriented substantially in the radial direction inside the mandrel 600. Additional layers can be formed on the inner surface 612 of the layer 608 in the internal cavity 606 of the mandrel 600. The rotational speed of the mandrel 600 with the material and filler can be adjusted to modify the filler orientation within the material layer.

The belts can typically have a width of about 350 mm to about 450 mm, and a length (or circumference) of about 500 mm to about 1000 mm, or even longer.

The methods of making flexible belts on the inside of a mandrel include forming the outer layer of the belt first on the inner surface of mandrel, and then forming one or more additional layers of material overlying the inner surface of the outer layer, i.e., from the outside towards the inside of the finished belt. The layers comprise materials selected to provide the desired properties in the belt, as well as having desired processing characteristics.

In an exemplary embodiment of the methods, a mold release agent is applied to the inner surface of a mandrel. The mandrel has an inner diameter of about 100 mm to about 1000 mm. Then, a fluoropolymer, such as Teflon®, Viton®, or the like, is applied to the inner surface of the mandrel. The applied material is heated to solidify the material and form the outer layer of the belt. The outer layer has a thickness of about 10 µm to about 50 µm.

Then, silicone, or the like, is applied over the inner surface of the outer layer. This material is then heated to solidify the material and form the intermediate layer of the belt. The intermediate layer has a thickness of about 50 µm to about 500 µm. The material used to form the intermediate layer of the belt is heated to a lower temperature than used to solidify the material of the outer layer.

Then, another material is applied to the inner surface of the intermediate layer. This material is then heated to solidify the material and form the inner layer. The inner layer has a thickness of about 10 µm to about 50 µm in the finished belt. The material used to form the inner layer of the belt has a lower curing or sintering temperature than the material used to form the intermediate layer.

In the embodiment, an adhesive layer can be applied between the outer layer and intermediate layer, and/or between the intermediate layer and the inner layer to enhance adhesion between these adjacent layers.

The as-formed belt can be removed from the internal cavity of the mandrel by any suitable technique. For example, the belt can be peeled from the inner surface of the mandrel by moving the belt to a second mandrel or a rod. The rod can have a diameter about 50% or less of the mandrel to provide space to maneuver the rod and belt inside of the mandrel. The belt peeling process can begin by directing a compressed gas flow between the inner surface of the mandrel and outer surface of the belt. In embodiments, the technique used to peel the finished belt from the inner surface of the mandrel does not crease the belt structure. The second mandrel or rod is used to wind the belt to a smaller size and then withdraw the belt from the mandrel the belt is formed on.

In embodiments, the inner surface of any one of the layers of the belt can be mechanically and/or chemically treated to have a desired surface finish. For example, the inner surface of the outer layer can be roughened using an abrasive surface, such as a sanding drum, to promote adhesion of the intermediate layer to the outer layer. Likewise, the inner surface of the intermediate layer can be roughened to promote adhesion of the intermediate layer to the inner layer. The inner surface of the inner layer can be finished to have a smooth surface, such as by rolling a smooth hard roller around the inner surface as the inner layer is solidifying. A liquid release agent can be used to enhance removal of the belt from the mandrel.

In embodiments, the materials used to form successive layers of the belt can be poured into the mandrel and the mandrel rotated to spread the material out to produce layers having substantially-uniform respective thicknesses. For example, the thickness variation of layers can be less than about 10%, such as less than about 5%. The uniformity of the layer thicknesses may be improved by high-speed spinning of the mandrel.

For polymers that have higher viscosity, flow coating techniques can be used to introduce the material inside of the mandrel. Liquid spray methods can also be used to apply the materials to the inner surface of the mandrel and/or to previously-sprayed layers inside the mandrel.

As described above, one or more fillers can be incorporated into one or more layers of the belts formed by coating or casting techniques. In such embodiments, centrifugal separation or orientation of fillers added to the layers can be used. Centrifugal techniques allow the formation of polymer-rich or polymer-poor regions within a given layer (i.e., a non-uniform distribution of the filler in the thickness dimension of the layer), and/or a desired orientation of filler particles (e.g., a radial orientation) during formation in the mandrel. For example, a polymer composition containing filler used to form a layer of the belt can be poured into the mandrel while the mandrel is slowly rotated. The mandrel can be heated to start to gel, stiffen or crosslink the polymer composition. Then, the rotational speed of the mandrel can be increased to cause more filler to move toward the inside of the partially-cured region of the filler-containing layer (i.e., toward the inner surface of the mandrel), producing a gradient of the filler concentration within the layer.

Fillers having different densities can be incorporated into respective layers of the belt. For example, fillers with different densities can be incorporated within the same layer of the belt. When the filler particle density is less than that of the matrix polymer material used to form a layer, the filler particles tend to move inwardly toward the center of the mandrel as the mandrel is rotated. When the filler particle density is greater than that of the matrix polymer material used to form a layer, the filler particles tend to move outwardly toward the inner surface of the mandrel as the mandrel is rotated. In embodiments, a mixture of filler particles having different densities (e.g., particles having a higher density than the matrix polymer material and particles having a lower density than the matrix polymer material) can be incorporated into a layer of the belt formed by a centrifugal technique to produce a distribution of the particles in the thickness direction of the layer. The filler particles having different densities can provide different properties in the thickness direction of the layer.

Embodiments of the belts including combinations of layers that are resistant to creasing can be turned inside-out after being formed inside mandrels. In such embodiments, a first material used to form the belt inner layer (e.g., polyimide) is first applied to the inner surface of the mandrel, then a second material used to form the belt intermediate layer (e.g., silicone) is applied to the inner surface of the layer formed with the first material, and then a third material used to form the belt outer layer (e.g., Teflon® or Viton®) is applied to the inner surface of the layer formed with the second material. Then, the belt is turned inside-out. In such embodiments, the belt surface that contacts media at the nip in fusers is "as cast" or ground, not "as molded."

Forming belts inside-out is desirable for making belts including an inner layer comprised of a material having a higher curing or sintering temperature than the materials used to form the remaining one or more layers of the belt, such as the intermediate and outer layers in three-layer belt structures. In embodiments of the belts including polyimide against the mandrel, the silicon rubber then Viton® rubber, for example, have curing temperatures in descending order (as the rubbers cure at similar temperatures.)

Other features of belts that are not turned inside-out after being formed on the mandrels can also be provided in belts that are turned inside out. The state of residual stress through the thickness of belts turned inside out may provide desirable physical properties to the belts. In embodiments in which the belt is turned inside-out, the surface formed against the mandrel will have compressive residual stress when it is in the working position. The next-formed interface (e.g., polyimide to silicone) will have tensile stresses on the surface of the polyimide due to bending around the neutral axis of the stiffest layer (polyimide). The rubbers will need to be strained more than the outer surface of the polyimide; consequently, their tension will tend to reduce the tensile residual stress on the outer surface of the polyimide. These states of stress when the belt is bent around small radii while in use may tend to improve the belt's resistance to cracking after many cycles.

Although the above description is directed toward fusers used in xerographic printing, it will be understood that the teachings and claims herein can be applied to any treatment of marking material on a medium. For example, the marking material can be toner, liquid or gel ink, and/or heat- or radiation-curable ink; and/or the medium can utilize certain process conditions, such as temperature, for successful printing. The process conditions, such as heat, pressure and other conditions that are desired for the treatment of ink on media in a given embodiment may be different from the conditions suitable for xerographic fusing.

It will be appreciated that various ones of the above-disclosed, as well as other features and functions, or alternatives thereof, may be desirably combined into many other different systems or applications. Also, various presently unforeseen or unanticipated alternatives, modifications, variations or improvements therein may be subsequently made by those skilled in the art, which are also intended to be encompassed by the following claims.

What is claimed is:

1. A method of making a belt for an apparatus useful in printing, comprising:
   forming a first layer of the belt using a first material comprising a first polymer applied directly onto an inner surface of a mandrel, the first layer including a first outer surface facing the inner surface of the mandrel and a first inner surface;
   forming a second layer of the belt using a second material comprising a second polymer applied over the first inner surface, the second layer including a second inner surface; and
   removing the belt from the mandrel, wherein forming the first layer of the belt comprises heating the first material to a first temperature to solidify the first material; and
   forming the second layer of the belt comprises heating the second material to a second temperature lower than the first temperature to solidify the second material over the first layer.

2. The method of claim 1, wherein the first outer surface is the outer surface of the belt and the second inner surface is the inner surface of the belt.

3. The method of claim 1, wherein removing the belt from the mandrel comprises turning the belt inside-out to result in the first outer surface forming the inner surface of the belt and the second inner surface forming the outer surface of the belt.

4. The method of claim 1, further comprising forming a third layer of the belt using a third material comprising a third polymer applied over the second inner surface, the third layer including a third outer surface and a third inner surface.

5. The method of claim 4, wherein:
   forming the first layer comprises heating the first material to a first temperature to solidify the first material;
   forming the second layer comprises heating the second material to a second temperature lower than the first temperature to solidify the second material; and
   forming the third layer comprises heating the third material to a third temperature lower than the second temperature to solidify the third material.

6. The method of claim 4, wherein the first outer surface forms the outer surface of the belt and the third inner surface forms the inner surface of the belt.

7. The method of claim 4, wherein removing the belt from the mandrel comprises turning the belt inside-out to result in the first outer surface forming the inner surface of the belt and the third inner surface forming the outer surface of the belt.

8. The method of claim 4, wherein:
   the first polymer is a fluoropolymer;
   the second polymer is a silicone; and
   the third polymer is a polyimide.

9. The method of claim 1, wherein:
   the first layer is formed by applying the first material to the inner surface of the mandrel and rotating the mandrel to distribute the first material on the inner surface to a substantially uniform thickness; and
   the second layer is formed by applying the second material to the first inner surface and rotating the mandrel to distribute the second material on the first inner surface to a substantially uniform thickness.

10. The method of claim 9, wherein:
    the second material contains filler particles having a higher thermal conductivity than the second polymer; and
    the filler particles are non-uniformly distributed in a thickness dimension of the second layer.

11. The method of claim 10, wherein the filler particles are rod-shaped and have length dimensions oriented substantially perpendicular to the first outer surface.

12. The method of claim 1, wherein the inner surface of the mandrel has a micro-texture or a nano-texture which is formed in the first outer surface during the forming.

13. The method of claim 1, wherein the first layer comprises an outer layer including the first outer surface and an inner layer including the first inner surface, the outer layer having a different composition and thermal conductivity than the inner layer.

14. A method of making a fuser belt for an apparatus useful for printing, comprising:
    forming a first layer of the belt using a first material comprising a first polymer applied directly onto an inner surface of a mandrel, the first layer including a first outer surface facing the inner surface of the mandrel and a first inner surface;
    forming a second layer of the belt using a second material comprising a second polymer applied over the first inner surface, the second layer including a second inner surface;

forming a third layer of the belt from a third material comprising a third polymer applied over the second inner surface, the third layer including a third inner surface; and removing the belt from the mandrel, wherein forming the first layer comprises heating the first material to a first temperature to solidify the first material; and forming the second layer comprises heating the second material to a second temperature lower than the first temperature to solidify the second material.

15. The method of claim 14, wherein:

forming the third layer comprises heating the third material to a third temperature lower than the second temperature to solidify the third material; and the first outer surface forms the outer surface of the belt and the third inner surface forms the inner surface of the belt.

16. The method of claim 14, wherein:
the first polymer is a fluoropolymer;
the second polymer is a silicone; and
the third polymer is a polyimide.

17. The method of claim 14, wherein:
the first layer is formed by applying the first material to the inner surface of the mandrel and rotating the mandrel to distribute the first material on the inner surface to a substantially uniform thickness;

the second layer is formed by applying the second material to the first inner surface and rotating the mandrel to distribute the first material on the first inner surface to a substantially uniform thickness; and the third layer is formed by applying the third material to the second inner surface and rotating the mandrel to distribute the third material on the second inner surface to a substantially uniform thickness.

18. The method of claim 14, wherein:
the second material contains filler particles having a higher thermal conductivity than the second polymer; and the filler particles are non-uniformly distributed in a thickness dimension of the second layer.

* * * * *